UNITED STATES PATENT OFFICE.

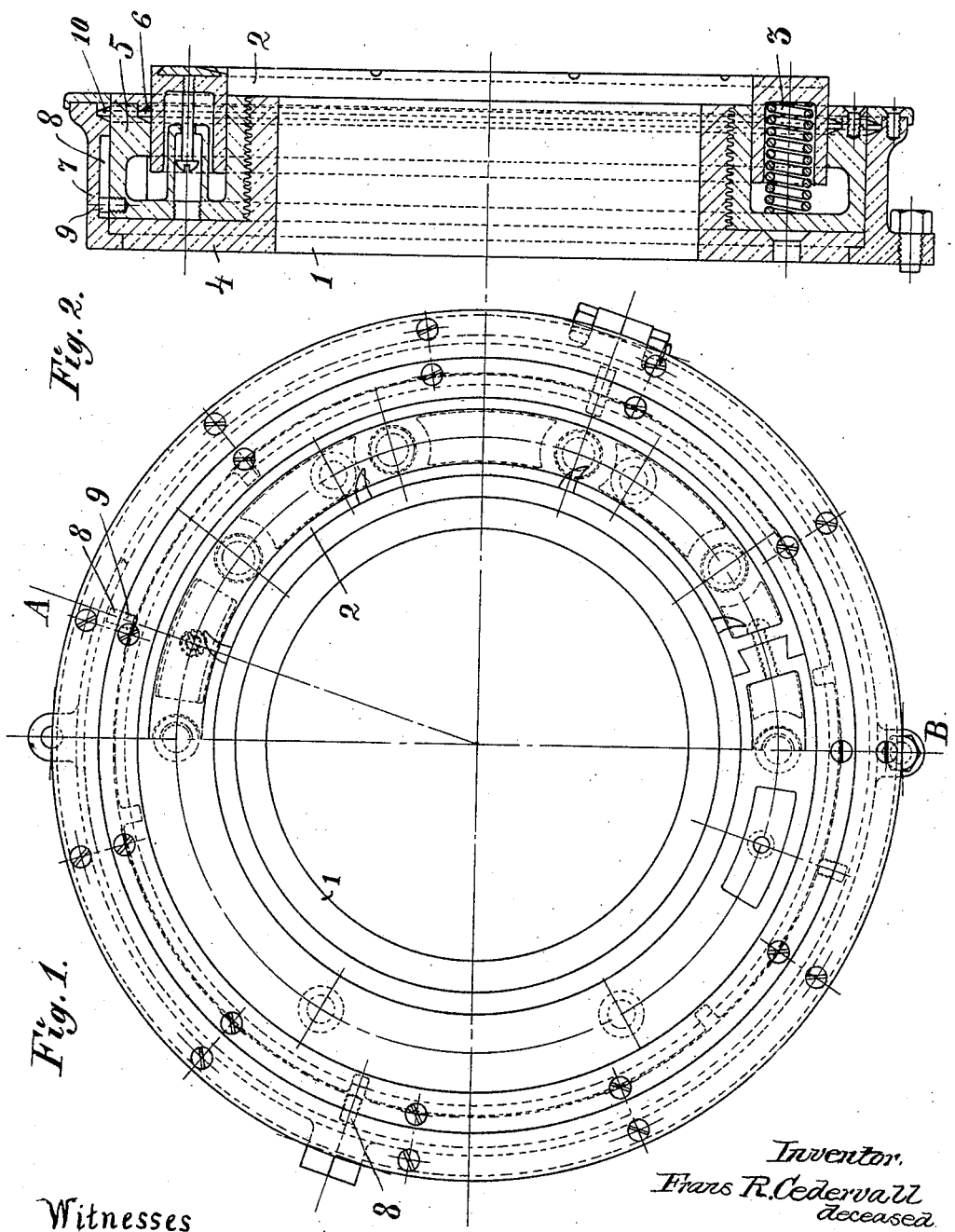

CARL WILHELM CEDERVALL, OF GOTHENBURG, SWEDEN, ADMINISTRATOR OF FRANS REINHOLD CEDERVALL, DECEASED.

PROTECTING-SLEEVE FOR SCREW-PROPELLER SHAFTS.

No. 810,187.

Specification of Letters Patent.

Patented Jan. 16, 1906.

Application filed April 8, 1904. Serial No. 202,199.

*To all whom it may concern:*

Be it known that I, CARL WILHELM CEDERVALL, a subject of the King of Sweden and Norway, and a resident of Gothenburg, Sweden, am the administrator of the estate of FRANS REINHOLD CEDERVALL, deceased, and that the said F. R. CEDERVALL did invent new and useful Improvements in Protecting-Sleeves for Screw-Propeller Shafts, of which the following is a specification, reference being had to the drawings accompanying and forming a part hereof.

This invention relates to improvements in protecting-sleeves for screw-propeller shafts.

For the purpose of protecting that part of screw-propeller shafts which is outside of the bushing in the stern-post against the corrosive influence of salt water special protecting-sleeves are in many cases used composed of two rings movable in relation to each other. The one ring of such protecting-sleeves is rigidly secured to the boss of the screw-propeller, while the other ring, having the shape of an annular piston, engages an annular groove or recess in the first-mentioned ring and is pressed against the end surface of the bushing in the stern-post by means of springs, so as to tighten against the said end surface. It has been found in using such protecting-sleeves that it is not possible in every case to provide at the same time a sufficient adjustment of the sleeve and a constant pressure between the said piston and the end of the shaft-bushing. This disadvantage is greatest when a new propeller is to be secured to the shaft, in which case it frequently happens that on account of inaccuracy in manufacture the new propeller does not fit the shaft at the same position as the old one. In such cases it is often desirable that the sleeve be adjustable within comparatively wide limits in order to obviate the tedious work of fitting the propeller on the shaft.

In accordance with the present invention the said increased adjustableness is obtained by having one or both of the said rings made in at least two parts which are movable or slidable in relation to each other. By this construction the length of the sleeve may be adjusted in accordance with the length of the space between the end of the shaft-bushing in the stern-post and the propeller within wider limits than heretofore, while at the same time maintaining a constant pressure of the springs.

In the accompanying drawings is shown one constructional form of the invention.

Figure 1 is an end view of the improved protecting-sleeve, and Fig. 2 is a section of the same on line A B in Fig. 1.

Referring to the drawings, 1 represents the ring, which is adapted to be secured to the boss of the propeller, while 2 represents the annular piston, which by means of springs 3 is adapted to be pressed against the end of the shaft-bushing. The said ring 1 is made in two ring-shaped parts 4 and 5, of which the part 4 is adapted to be directly secured to the boss of the propeller, while the part 5 is screwed on the part 4 and supports the annular piston 2, together with the springs 3 and a packing-ring 6 for the said piston.

In order to enable the rings 4 and 5 to be adjusted in relation to each other in a simple manner for varying the length of the protecting-sleeve, a ring 7 is rotatably but not slidably arranged on the said part 4, the said ring 7 being divided and provided with an inwardly-extending flange and axially-running grooves 8, in which enter pins 9 or the like, secured to the part 5. When the said part 7 is rotated, the part 5 will thus be displaced on the part 4 in the one direction or the other or unscrewed from the said part 4. In order to prevent the water from entering between the parts 4 and 5, a packing ring or rings 10 is or are provided between the same.

Obviously the adjustment of the parts 4 and 5 in relation to each other may be effected by other means than those shown in the drawings. For instance, the ring 7 may be screwed on the part 4 and engage by means of an annular flange or the like a corresponding annular groove on the part 5, in which case the latter is arranged slidably relative to the part 4. Instead of two rings adjustable in relation to each other a larger number of such rings may be used, whereby the degree of adjustment may be correspondingly increased. The annular piston 2 may be made in two or more parts slidable in axial direction in relation to each other for the purpose set forth.

Having now described the invention and in what manner the same may be performed, what is claimed is—

1. A protecting-sleeve for screw-propeller shafts adapted to protect the part of the latter outside of the bushing in the stern-post and comprising rings adjustable in relation to each other, a piston-like ring fitted into an annular opening in one of said rings, and springs adapted to press the said piston-like ring outwardly from its seat, substantially as and for the purpose set forth.

2. A protecting-sleeve for screw-propeller shafts comprising two rings provided on the shaft and serving to protect that part of the same which is outside of the bushing in the stern-post, one of said rings fitted into the other and adjustable thereon; a piston-like ring fitted into an annular opening in the larger ring; and springs interposed between the piston-like ring and its seat on the larger ring to press the former outwardly from the latter, substantially as described and shown.

3. A protecting-sleeve for screw-propeller shafts comprising two rings provided on the shaft and serving to protect that part of the same which is outside of the bushing in the stern-post, one of said rings fitted by screw-threaded connection into the other and adjustable thereon; a piston-like ring fitted into an annular opening in the larger ring; springs interposed between the piston-like ring and its seat on the larger ring to press the former outwardly from the latter; an outer ring provided with an inwardly-extending flange and grooves and surrounding said larger ring, the larger ring being provided with a shoulder and pins which coöperate with the flange and grooves of the outer ring, substantially as and for the purpose described and shown.

In testimony whereof I have signed my name to this specification in the presence of two subscribing witnesses.

CARL WILHELM CEDERVALL,
*Administrator of the estate of Frans Reinhold Cedervall, deceased.*

Witnesses:
OTTO RICHARD SWERRE,
CARL EDVIN OLOF OLLÉN.